Patented Nov. 10, 1931

1,831,059

UNITED STATES PATENT OFFICE

LLOYD C. DANIELS, OF CRAFTON, PENNSYLVANIA, ASSIGNOR TO THE SELDEN COMPANY, OF PITTSBURGH, PENNSYLVANIA, A CORPORATION OF DELAWARE

PURIFICATION OF CRUDE ANTHRACENE

No Drawing.   Application filed July 27, 1928.  Serial No. 295,852.

This invention relates to purification of crude anthracene.

Crude anthracene contains as its main impurities carbazole and phenanthrene together with a certain amount of oily material ordinarily referred to as dead oils and minor amounts of other organic compounds. In the past crude anthracene has been purified by the use of various solvents which have low solvent power for anthracene, at least in the cold, but high solvent power for one or both of the main impurities. Examples of such solvents are pyridine, which dissolves both carbazole and phenanthrene readily, and mononuclear aromatic hydrocarbons, such as benzene, toluene and solvent naphtha, which dissolve phenanthrene readily and have little solvent power for carbazole or anthracene in the cold.

According to the present invention crude anthracene is treated with a chlorinated aromatic hydrocarbon or a mixture of chlorinated aromatic hydrocarbons. I have found that the chlorinated aromatic hydrocarbons have a very high solvent power for phenanthrene and do not notably dissolve anthracene in the cold. While the chlorinated aromatic hydrocarbons in general show solvent power for phenanthrene, the chlorinated mononuclear hydrocarbons appear to show the greatest economy, and orthodichlorbenzene is the preferred solvent both because of its efficiency and its low price and ready availability. The chlorinated aromatic hydrocarbons are all substantially immiscible with water, a very important factor in the purification of crude anthracene since it permits the recovery of the last traces of solvent by steam distillation from both the refined product and the crude residues, a procedure which is not feasible with solvents which dissolve in water to a considerable extent, such as, for example, pyridine.

The invention will be described in greater detail in connection with the following specific examples which illustrate a few typical embodiments of the invention using some of the cheaper and more common chlorinated aromatic hydrocarbons as solvents.

Example 1

400 kilos of 30–40% crude anthracene are suspended in 2,000 liters of orthodichlorbenzene in the cold and agitated for about twelve hours. The undissolved material is filtered off and contains approximately 60% of anthracene and 23% of carbazole, the remainder being mainly phenanthrene. The original crude anthracene contained only about 30% of anthracene. Half of the solvent is removed from the mother liquor by distillation and the product separated out. It contains about 62% anthracene and 21% carbazole.

The remaining solvent is distilled off and a residue is obtained containing about 8.5% of anthracene and 6% of carbazole, the remainder being largely phenanthrene with some dead oils.

Similar results are obtained by using monochlortoluene, monochlorbenzene or 2.3.dichlor- or 2.5.dichlortoluene.

Example 2

400 kilos of crude anthracene containing about 22–30% anthracene are dissolved in 2,000 liters of orthodichlorbenzene at 80° C. or higher. More crude anthracene is added in portions of 25 kilos until it no longer dissolves. With the ordinary run of 30% crude anthracene the total amount dissolved by the 2,000 liters is usually about 700 kilos. 200 liters of orthodichlorbenzene are added, the solution being maintained at at least 80° C. and is then allowed to cool to room temperature, or lower. The precipitate is filtered off and contains about 52% of anthracene and 36% of carbazole, the remainder being of course mainly phenanthrene.

The mother liquor is then distilled to half its volume and allowed to cool. A product separates out, containing about 45% anthracene and 24% carbazole.

The mother liquor is then completely distilled off, using steam to remove the last traces of solvent and the product is a good grade of crude phenanthrene containing very little anthracene and carbazole as impurities.

Example 3

Better results are normally obtained with an excess of solvent and this appears to be generally true for all of the chlorinated solvents. Thus, for example, a 30% crude anthracene is recrystallized from a minimum amount of orthodichlorbenzene which will just dissolve the product at 80° C., the resulting anthracene contains about 52% anthracene and 36% carbazole, the first fraction containing about 61% anthracene and 24% carbazole. When a 30% excess of orthodichlorbenzene is used the recrystallized product contains about 66% anthracene and 24% carbazole and the first fraction about 61% anthracene and 22.5% carbazole. Similar results are obtained with other chlorinated aromatic hydrocarbons such as monochlorbenzene or monobrombenzene.

The invention has been described in connection with the use of chlorinated aromatic hydrocarbons alone. It should be understood, of course, that they may be mixed with other known solvents, such as pyridine, toluol, solvent naphtha, gasoline, acetone, alcohol and the like. Instead of suspending in the cold, of course, the crude anthracene can also be washed with one or more of the solvents of the present invention. The washing method is somewhat quicker but usually results in a slightly higher loss of solvent and lower recovery of anthracene.

What is claimed as new is:

1. In the purification of crude anthracene, the step which comprises subjecting the crude anthracene to the action of a solvent containing at least one chlorinated mononuclear aromatic hydrocarbon.

2. In the purification of crude anthracene, the step which comprises subjecting the crude anthracene to the action of a solvent containing orthodichlorbenzene.

3. In the purification of crude anthracene, the step which comprises recrystallizing the material from a solvent containing a chlorinated mononuclear aromatic hydrocarbon.

4. In the purification of crude anthracene, the step which comprises recrystallizing the material from a solvent containing orthodichlorbenzene.

5. The herein described method of refining crude anthracene comprising treating the same with halogenated aromatic hydrocarbon of the benzene series.

6. The herein described method of refining anthracene comprising treating the anthracene with a mixture of a halogenated aromatic hydrocarbon of the benzene series and a liquid hydrocarbon.

7. The herein described method of refining anthracene comprising treating the anthracene with a mixture of a halogenated aromatic hydrocarbon of the benzene series and pyridine.

8. The herein described method of refining anthracene comprising treating the anthracene with a mixture of orthodichlorbenzole and pyridine.

9. The herein described method of refining crude anthracene, comprising treating the same with halogenated aromatic hydrocarbons of the benzene series in the liquid phase.

10. The herein described method of refining crude anthracene comprising treating the same with orthodichlorbenzole in the liquid phase.

Signed at Pittsburgh, Pennsylvania this 26th day of July, 1928.

LLOYD C. DANIELS.